United States Patent [19]
von Kaler

[11] Patent Number: 5,287,769
[45] Date of Patent: Feb. 22, 1994

[54] OFFSET SHAFT ARRANGEMENT FOR IN-LINE SHIFT TRANSAXLE HOUSING

[75] Inventor: Roland L. von Kaler, Tecumseh, Mich.

[73] Assignee: Tecumseh Products Company, Tecumseh, Mich.

[21] Appl. No.: 907,602

[22] Filed: Jul. 2, 1992

[51] Int. Cl.⁵ .................................................. F16H 37/08
[52] U.S. Cl. ...................................... 74/606 R; 74/371
[58] Field of Search ................... 74/369, 371, 606 R; 475/200, 207, 900

[56] References Cited

U.S. PATENT DOCUMENTS

| | | | |
|---|---|---|---|
| 3,309,943 | 3/1967 | Kosman et al. | 475/200 |
| 4,449,424 | 5/1984 | Hauser | 74/606 R X |
| 4,702,120 | 10/1987 | Okada et al. | 74/371 |
| 4,713,983 | 12/1987 | Rundle | 74/371 |
| 4,771,636 | 9/1988 | Fujita | 74/371 |
| 4,800,771 | 1/1989 | Edwards et al. | 74/606 R X |
| 4,809,560 | 3/1989 | Nemoto | 74/371 |
| 4,827,783 | 5/1989 | Yamaoka et al. | 74/371 |
| 4,841,794 | 6/1989 | Hikishima | 74/371 |
| 4,843,910 | 7/1989 | Loeber et al. | 475/900 X |
| 4,856,867 | 8/1989 | Nemoto | 74/606 R |
| 4,858,739 | 8/1989 | Nemoto | 192/18 R |
| 4,930,367 | 6/1990 | Nagasawa | 74/606 R X |
| 4,966,574 | 10/1990 | von Kaler et al. | 475/206 |
| 5,073,159 | 12/1991 | Kurachi | 475/200 X |
| 5,078,662 | 1/1992 | Taguchi et al. | 475/200 |
| 5,156,576 | 10/1992 | Johnson | 74/606 R X |

Primary Examiner—Rodney H. Bonck
Assistant Examiner—Khoi Ta
Attorney, Agent, or Firm—Baker & Daniels

[57] ABSTRACT

The present invention is a transaxle with an offset shaft thereby having a reduced profile. The transaxle includes an upper housing and a lower housing defining a split line. A vertical input shaft and an axle shaft are rotatably disposed in the housing. A shift shaft is rotatably disposed within the housing and operably connected to the input shaft. Gears on the shift shaft mesh with gears on a counter shaft to transmit rotational motion from the one input shaft to the axle shaft. The axle shaft is disposed in a first generally horizontal plane and the shift shaft is disposed in a second generally horizontal plane below the first generally horizontal plane to reduce the profile of the transaxle.

20 Claims, 3 Drawing Sheets

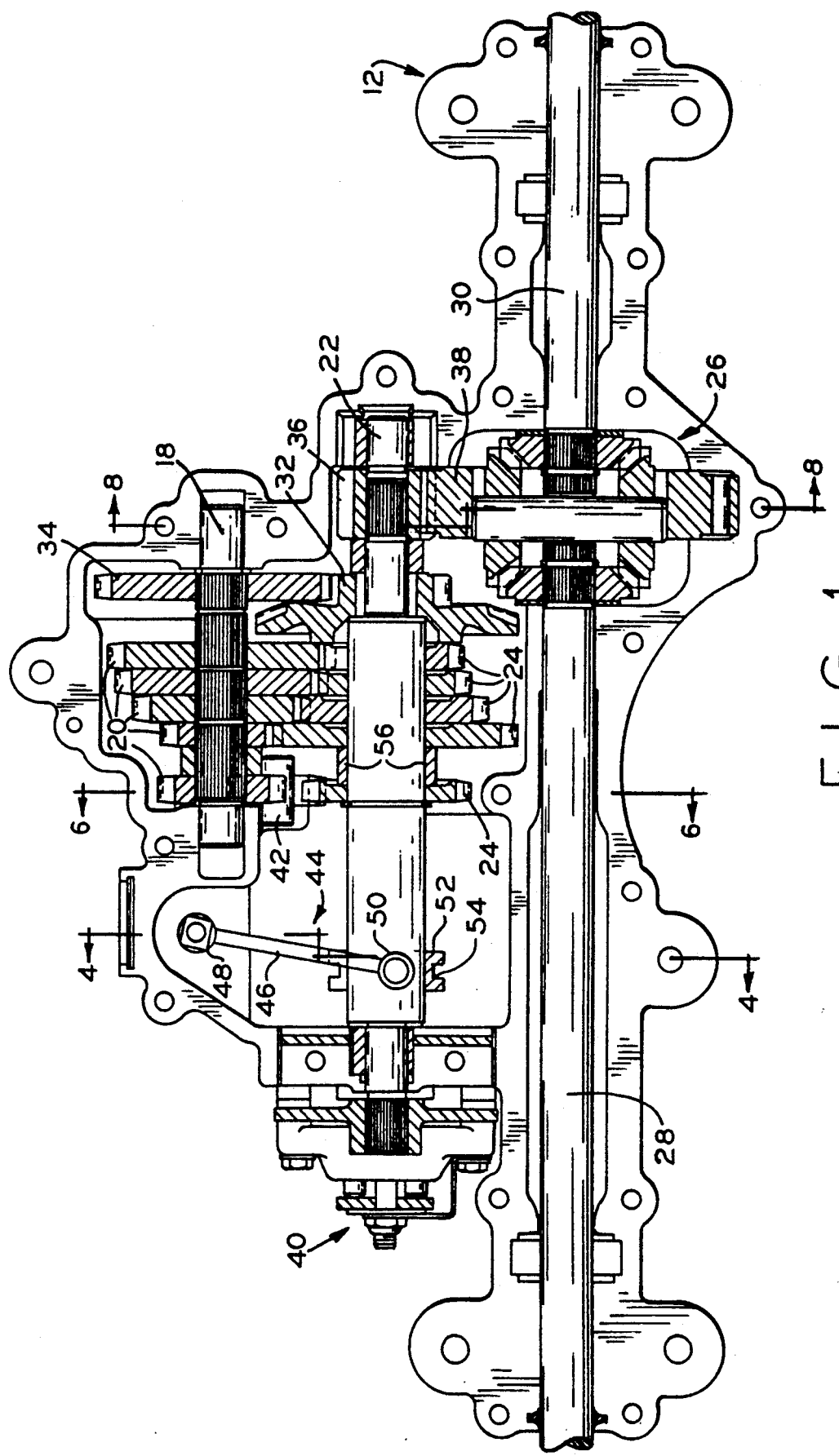
FIG_1

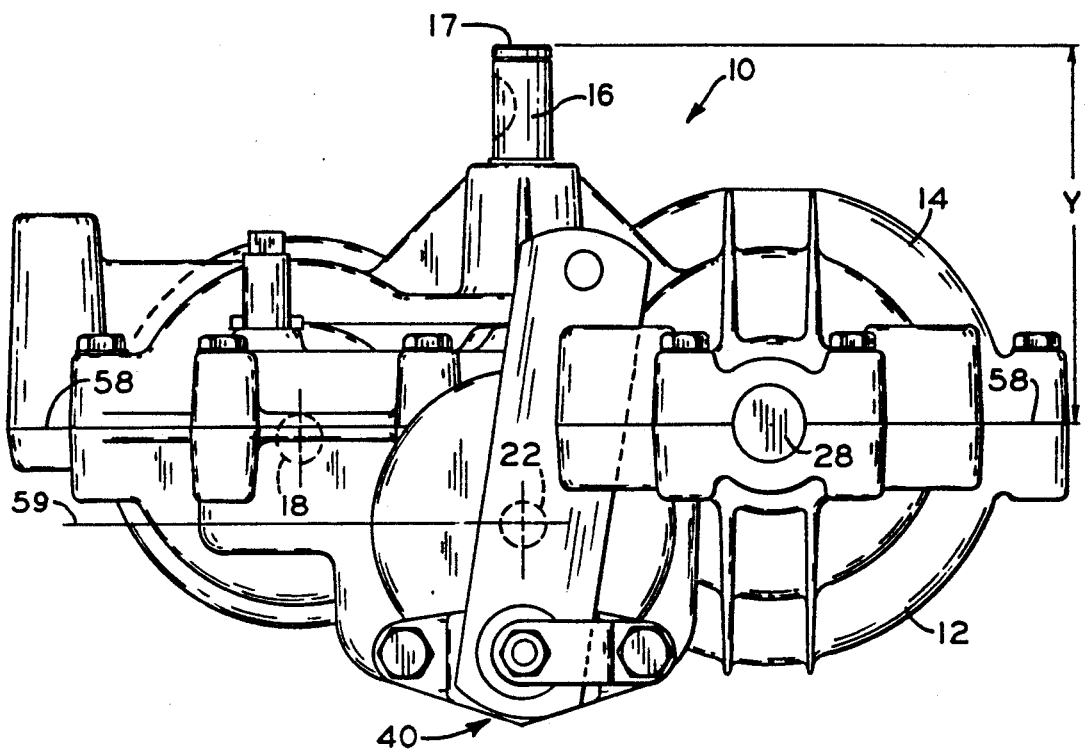
FIG_2
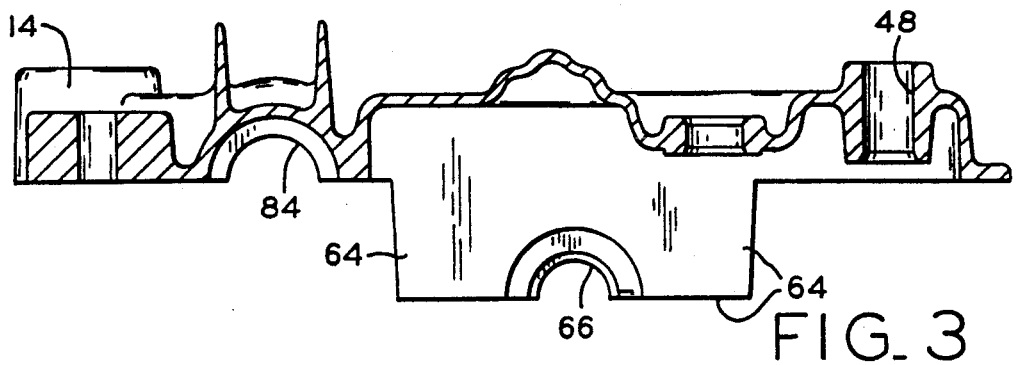
FIG_3
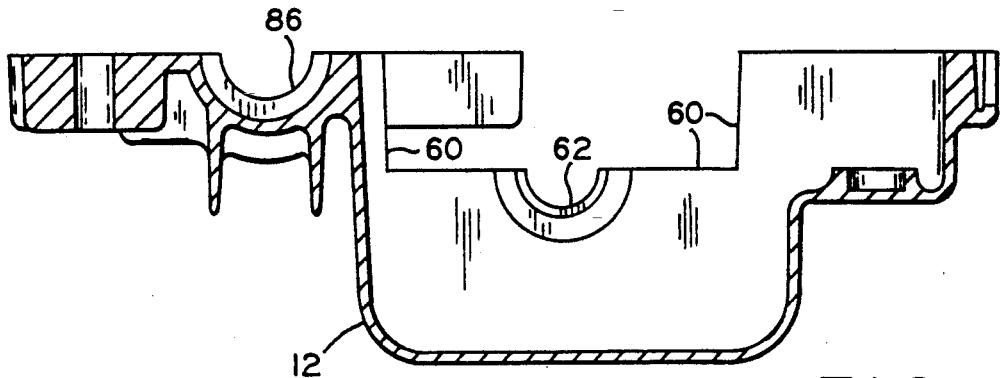
FIG_4

OFFSET SHAFT ARRANGEMENT FOR IN-LINE SHIFT TRANSAXLE HOUSING

BACKGROUND OF THE INVENTION

1. Field of the invention.

The present invention relates to small transaxles such as used in riding lawn mowers and the like, and, more particularly, to horizontally oriented transaxles with vertical input shafts.

2. Description of the related art.

Manually shifted transaxles of the type concerned herein typically employ a shift shaft carrying a plurality of freely journalled speed change gears which can be selectively coupled to the shift shaft by a shift mechanism. Each of the speed change gears is in constant running mesh with one of a plurality of companion gears affixed to a counter shaft which rotate together in unison. The vertical input shaft transmits the input power to the transaxle via a bevel pinion gear engaged with a bevel gear freely rotatable on the shift shaft which has a combination gear enmeshed with a gear affixed to the counter shaft. The receiving bevel gear thereby drives the counter shaft which transfers the motion to the shift shaft via the selected speed change gear. The shift shaft then transmits the input power to the output axle shafts via a differential.

It is known in the art to provide a transaxle having a plurality of shafts disposed therein, including a vertical input shaft and axle shafts, which are disposed in a generally parallel relationship to each other. The vertical input shaft is operably connected to the axle shafts by transmission shafts which through gearing transmit rotational motion from the upper most input receiving shaft to the lower axle shafts. Moreover, the vertical input shaft is attached at the upper end thereof to a pulley, and is rotatably carried at the lower end thereof by a bearing formed in the housing of the transaxle. Because of the vertical height of the pulley and its associated input receiving shaft, such transaxles tend to have a relatively high profile height.

In certain applications, it is desireable to provide a transaxle having a relatively low profile height. The shafts within such a transaxle are typically oriented in a horizontal relationship to each other within the transaxle housing. For example, U.S. Pat. No. 4,966,574 to von Kaler, et al., assigned to the assignee of the present invention and incorporated herein by reference, discloses a horizontally oriented transaxle in which a shift shaft, counter shaft and output drive shafts are disposed in a common horizontal plane. Such a transaxle has the advantage of simplifying assembly and repair because of the ease of access to the shafts which are supported along the split line of the transaxle.

In applications such as riding lawnmowers, the vertical distance between the axle shafts and other components of the lawnmower may be relatively small. In some specific arrangements of riding lawn mowers, that vertical distance may be critical to the riding lawnmower design in order to provide space for other components. For these arrangements, it is thus desireable to provide a transaxle having a relatively low profile.

What is needed in the art is a horizontally oriented transaxle having an input shaft which receives rotational input power at a height which is closer to the axis of the axles than heretofore possible, thereby providing a transaxle with a lower profile.

SUMMARY OF THE INVENTION

The present invention provides a transaxle having a plurality of shafts wherein an axle shaft is disposed in a first horizontal plane and an input receiving shaft disposed in a second horizontal plane below the first horizontal plane, thereby allowing the vertical input shaft to be disposed at a lower position than heretofore possible.

In general, the transaxle includes a housing, which may be a split housing, having a plurality of shafts rotatably disposed therein. The plurality of shafts include a vertical input shaft, an axle shaft disposed in a first horizontal plane and an input receiving shaft disposed below the vertical input shaft in a second horizontal plane below the first horizontal plane, thereby providing a transaxle with a reduced profile height. The transaxle may have an axle shaft and a counter shaft disposed on the split line of the housing and a shift shaft which is arranged as the input receiving shaft. Compared to known transaxles having an axle shaft, counter shaft, and shift shaft which are all generally disposed in a common horizontal plane, the profile height of the present invention is reduced by the distance between the first and second horizontal planes of the present invention. The present invention provides the novel approach of reducing the profile height by disposing the input receiving shaft below the horizontal plane extending through the axle shafts.

The input receiving shaft is supported in the housing by a bearing formed between a projection of the upper housing and a recess of the lower housing. The interface of the projection and recess forms a secondary split line located on the second horizontal plane in order to provide the rotational support necessary for the input receiving shaft. With this arrangement, all the horizontal transmission shafts may be supported by bearings integrally formed in the housing, which reduces the number of transaxle components and simplifies manufacture.

The invention comprises, in one form thereof, a transaxle having a housing and a plurality of shafts rotatably disposed within the housing. The plurality of shafts include a vertical input shaft, an input receiving shaft, a counter shaft operably connected to the input shaft, and an axle shaft. The axle shaft and the counter shaft are disposed in a first generally horizontal plane. The transaxle includes gears which are arranged to transmit rotational motion from the input receiving shaft to the axle shaft. The input receiving shaft is disposed in a second generally horizontal plane below the first generally horizontal plane.

An advantage of the present invention is that the outer end of the input shaft which receives rotational input power and which is disposed in the upper housing may be disposed a relatively short distance above the horizontal plane extending through the axis of an axle shaft, thereby decreasing the profile height of the transaxle.

Another advantage is that the transaxle may be used in applications having a short vertical distance between the axle shaft and the components unrelated to the transaxle which are disposed above the transaxle, such as the seat of a riding lawn mower.

Yet another advantage is that the components of the specific application unrelated to the transaxle which are disposed above the transaxle, such as the seat of a riding lawn mower, may be located closer to ground level, thereby lowering the center of gravity and providing a more vertically compact mower.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 shows a top view of the transaxle with the upper housing removed;

FIG. 2 shows a side view of the embodiment shown in FIG. 1 with the upper and lower housings attached;

FIGS. 3 and 4 show side sectional views of the upper and lower housings of the embodiment in FIG. 1 taken along section line 4—4;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 5:
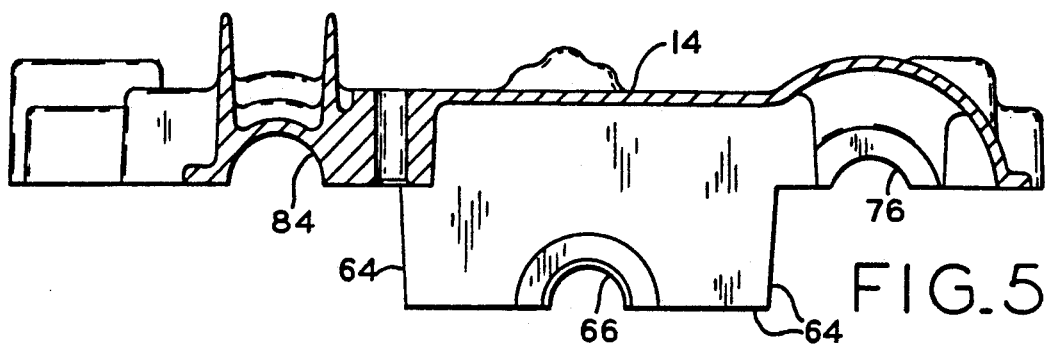
FIGS. 5 and 6 show side sectional views of the upper and lower housings of the embodiment in FIG. 1 taken along section line 6—6.
Figure 6:
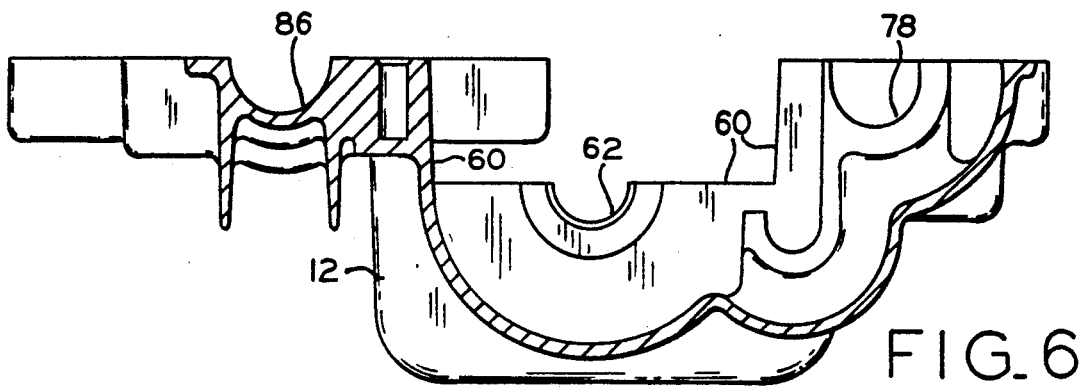

Referring now the drawings and particularly to FIGS. 1 and 2, transaxle 10 generally includes a lower housing 12, upper housing 14 with a vertical input shaft 16 rotatably disposed therein, counter shaft 18 having a plurality of companion gears 20 fixed thereto, shift shaft 22 having a plurality of spur gears 24 rotatably disposed thereon, differential 26, and axle shafts 28 and 30.

The phrase "profile height," as used in this application, refers to the height of the transaxle 10 from the axis of axle shafts 28 and 30 to outer end 17 of input shaft 16. The profile height of transaxle 10 is represented by the distance Y shown in FIG. 2.

The phrase "horizontally oriented transaxle," as used in this application, refers to a transaxle having a plurality of shafts rotatably disposed therein which are generally positioned in a horizontal relationship to each other. The shafts may be positioned coplanar or slightly offset with respect to each other. Such a transaxle typically has an overall dimension in the horizontal direction which is greater than an overall dimension in the vertical direction.

The phrases "below" or "above," as used in this application, refer to the vertical position below or above a reference plane. That is, in the embodiment shown in the drawings, transaxle 10 includes axle shafts 28 and 30 which extend in a direction parallel to the ground. The axis of axle shafts 28 and 30 is thus disposed a defined distance above the ground in a horizontal plane parallel to the ground. The horizontal plane extending through the axis of axle shafts 28 and 30 may be defined as a first horizontal plane. Other components of transaxle 10 not disposed within the first horizontal plane may then be defined as either above or below the first horizontal plane. For example, shift shaft 22, which also extends in a direction generally parallel to the ground, is disposed within housing 12 or 14 such that the axis thereof is disposed below the first horizontal plane. A second horizontal plane extending through the axis of shift shaft 22 is defined as a second horizontal plane disposed "below" the first horizontal plane.

Lower housing 12 together with upper housing 14 (shown together in FIG. 2, and separately in FIGS. 3-8) rotatably supports axle shafts 28 and 30, shift shaft 22, and counter shaft 18. Vertical input shaft 16 (FIG. 2) includes a bevel gear (not shown) affixed at the lower end thereof which enmeshes with and turns input bevel gear 32. Input bevel gear 32 is freely rotatable about shift shaft 22 and engaged with spur gear 34 affixed to counter shaft 18. Companion gears 20 of counter shaft 18 engage spur gears 24 of shift shaft 22 and transmit rotational motion thereto. Spur gear 36 of shift shaft 22 in turn drives ring gear 38 of differential 26 and thereby turns axle shafts 28 and 30 in a forward direction. A reverse gear may be provided by stub shaft and gear 42 disposed between one of companion gears 20 and one of spur gears 24. In addition, transaxle 10 may be slowed or stopped by operation of brake assembly 40.

The gear ratio of transaxle 10 is determined by shifting mechanism 44 as is known in the art. Generally, shifting mechanism 44 includes shift fork 46 rotatably disposed in bushing 48, detent mechanism 50 having a finger (not shown) disposed thereunder for engaging collar 52 disposed about shift shaft 22. Shift fork 46 is connected in a known manner to linkage (not shown) of the particular application, such as a riding lawn mower, which allows an operator to change gears manually. Shift fork 46 is supported in upper and lower housings 12 and 14, respectively, and the finger of detent mechanism 50 extends into annular groove 54 of collar 52. Collar 52 is located on shift shaft 22 and operably engages keys (not shown). The keys are disposed within shift shaft 22 and selectively engage internal recesses (not shown) in spur gears 24 to provide forward and reverse gear ratios. Neutral sleeve 56 provides an axial position within shift shaft 22 wherein the keys do not engage the internal recesses of spur gears 24. Alternatively, neutral sleeve 56 may include an internal recess to provide an engagable neutral position.

In accordance with the present invention, lower housing 12 and upper housing 14 define a split line housing wherein the split line is defined by the interface between the external surfaces of lower housing 12 and upper housing 14. As can be seen in FIG. 2 the split line 58 defines a first generally horizontal plane. First horizontal plane 58 extends through the axis of axle shaft 28 and is disposed slightly above the axis of counter shaft 18. Thus, for practical purposes, axle shaft 28 and counter shaft 18 are considered as being disposed in a first generally horizontal plane 58.

Shift shaft 22 is disposed below vertical input shaft 16 and extends in a direction which is generally parallel to axle shafts 28 and 30, and counter shaft 18. Second horizontal plane 59 extends through the axis of shift shaft 22 and is generally parallel to the first horizontal plane. Thus, second horizontal plane 59 extends through the axis of shift shaft 22 which is disposed below first horizontal plane 58. Specifically, in the embodiment shown in the drawings, second horizontal plane 59 extending through the axis of shift shaft 22 is disposed about one inch below first horizontal plane 58.

To allow shift shaft 22 to be located below the split line as described above, lower housing 12 is formed with recesses disposed below the split line and upper housing 14 is formed with projection extending below the split line to form a secondary split line at the interface therebetween which is generally along second horizontal plane 59. More particularly, as may be seen in FIGS. 3 and 4, the portion of lower housing 12 adjacent to brake assembly 40 is formed with a first recess 60 having a shift shaft supporting recess 62 formed therein. In the embodiment shown, shift shaft supporting recess 62 is formed with an integral friction reducing bearing to rotatably carry shift shaft 22. Mating with first recess 60 of lower housing 12 is a first projection 64 formed in upper housing 14 having a similarly formed shift shaft supporting recess 66 formed therein. Alternatively, shift shaft supporting recesses 62 and 66 may be adapted to engage and support a separate friction reducing bearing which rotatably carries shift shaft 22.

Figure 7:
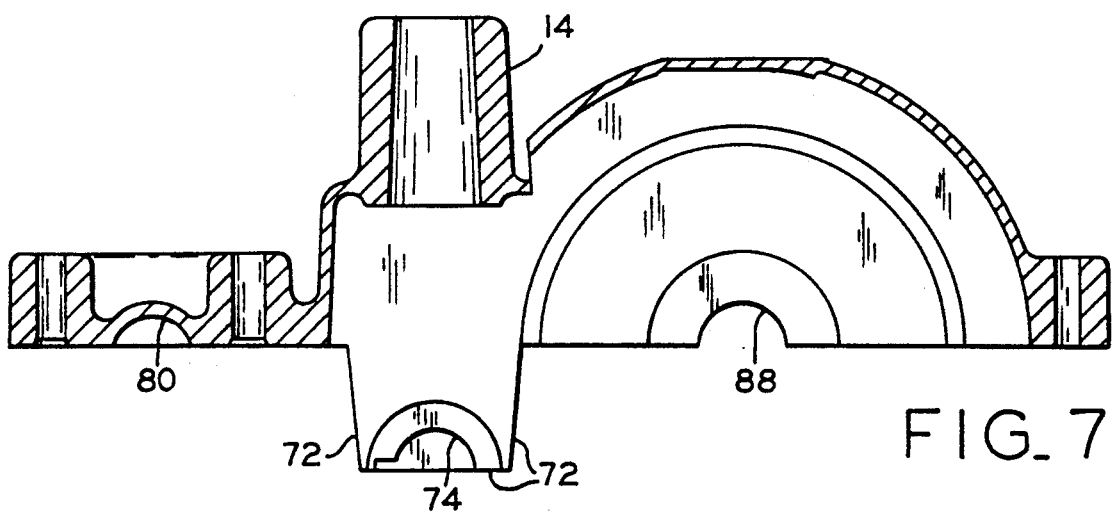
FIGS. 7 and 8 show side sectional views of the upper and lower housings of the embodiment in FIG. 1 taken along section line 8—8.
Figure 8:
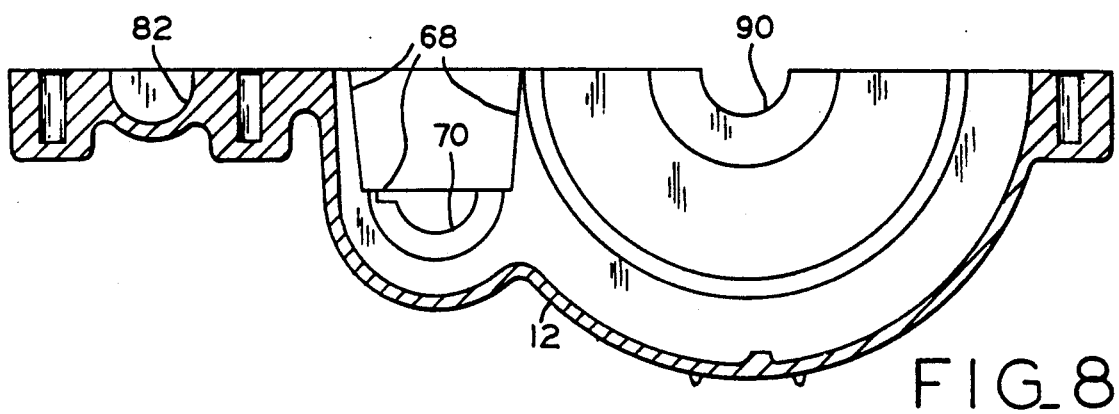

Likewise, as may be seen in FIGS. 7 and 8, the portion of lower housing 12 opposite of brake assembly 40 supporting the other end of shift shaft 22 is formed with a second recess 68 having a shift shaft supporting recess 70 formed therein. In the embodiment shown, shift shaft supporting recess 70 is formed with an integral friction reducing bearing to rotatably carry shift shaft 22. Mating with recess 68 of lower housing 12 is a second projection 72 having a similarly formed shift shaft supporting recess 74 formed therein. Alternatively, shift shaft supporting recesses 70 and 74 may be formed to support a separate friction reducing bearing which rotatably carries shift shaft 22.

Lower and upper housings 12 and 14 also rotatably support counter shaft 18 and axles 28 and 30 with integrally formed bearings. Counter shaft 18 is supported on one side by upper and lower bearings 76 and 78, respectively, of FIGS. 5 and 6. The other end of counter shaft 18 is supported by upper and lower bearings 80 and 82, respectively, of FIGS. 7 and 8. Axle 28 is rotatably supported by upper and lower bearings 84 and 86, respectively, see FIGS. 3-6. Axle 30 is rotatably supported by upper and lower bearings 88 and 90, respectively, see FIGS. 7 and 8. As is well known in the art, these integrally formed bearings may be adapted to engage and support a separate friction reducing bearing.

Although the embodiment shown in the FIGS. 1-8 illustrates a lower and upper housing each respectively having a pair of recesses and projections for rotatably carrying shift shaft 22 in a second generally horizontal plane, lower housing 12 and upper housing 14 may also respectively be formed, in certain other embodiments, with additional internal supporting means adapted to rotatably carry shift shaft 22 disposed in an offset position within the second generally horizontal plane, the molding of such supporting means being within the knowledge of one skilled in the art.

Thus, as is apparent from FIGS. 3-8, lower housing 12 and upper housing 14 are formed in a manner providing easy assembly and disassembly of shift shaft 22 disposed in an offset position from axle shafts 28 and 30.

Providing a shift shaft 22 which is disposed in a second generally horizontal plane below a first generally horizontal plane extending through the axis of the axle shifts 26 and 28 has several advantages, including, but not limited to, the following: As may be seen in FIG. 2, shift shaft 22 and the plurality of spur gears 24, which are rotatably disposed thereon, are located directly under vertical shaft 16. By moving the axis of shift shaft 22 downward from split line 58, input shaft 16 may likewise be moved downwardly. Moving the input shaft 16 downward causes the profile height, illustrated by the vertical dimension Y (FIG. 2), to be reduced. Reducing the profile height Y in turn allows transaxle 10 to be incorporated into applications, such as riding lawnmowers, which may have a relatively small vertical distance between the split line 58 and/or the axis of axle shafts 28 and 30, and other components of the application unrelated to the transaxle 10 which are disposed above transaxle 10, such as a seat for an operator of a riding lawnmower.

Moreover, vertical input shaft 16 extending above upper housing 14 of necessity must be of sufficient length to allow a pulley to be mounted thereon for receiving rotational input motion from a specific application, such as the internal combustion engine of a riding lawnmower. Reducing the length of input shaft 16 extending above upper housing 14 to thereby reduce the profile height Y of transaxle 10 is limited because of the physical dimensions of the pulley, the required bearing support for input shaft 16, and required tolerances. The present invention overcomes this limitation by disposing shift shaft 22 below the first plane extending through axle shafts 28 and 30.

FIGS. 1-8 illustrate an embodiment of the present invention wherein vertical input shaft 16 is disposed above shift shaft 22, and shift shaft 22 is disposed in a second horizontal plane below a first horizontal plane extending through the axis of axle shafts 28 and 30. However, it is also possible that transaxles having gearing different from the disclosed embodiment could also be used with the present invention. For example, it may be possible for the input shaft to be disposed above the counter shaft and provide rotational input motion thereto. In such event, the axis of the shift shaft and axle shafts may be disposed in a first generally horizontal plane, and the axis of the counter shaft may be disposed in a second generally horizontal plane below the first generally horizontal plane.

Moreover, it may also be possible to provide a transaxle having only an input shaft, the shift shaft and a pair of axle shafts. The input shaft and shift shaft could be provided, for example, with enmeshing bevel gears to transmit rotational motion from the input shaft to the shift shaft. The shift shaft and one of the axle shafts could be provided with a plurality of enmeshing spur gears journalled on those shafts to in turn transmit rotational motion to axle shafts. A plurality of gears splined to a common sleeve on one of the axle shafts may serve as a counter shaft which coacts with a shift shaft to transmit rotational motion from the input shaft, through the meshing gears and differential, to the axles. The shift shaft may receive the motion from the input shaft and be disposed in a horizontal plane substantially below that of the axles to reduce the profile of the transaxle.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transaxle for a vehicle comprising:
   a housing;
   a vertical input shaft disposed in said housing and having a top end extending out of said housing;
   a plurality of horizontal shafts rotatably disposed within said housing and disposed in a orthogonal relationship relative to said vertical input shaft, said plurality of shafts including an input receiving shaft, a counter shaft operably connected to said input receiving shaft, and an axle shaft, said input receiving shaft, counter shaft and axle shaft defining respective axes of rotation; and a plurality of gears on said input receiving and counter shafts interconnected to transmit rotational motion from said input receiving shaft to said axle shaft;

said axle shaft axis of rotation and said counter shaft axis of rotation being disposed in a first generally horizontal plane, said input receiving shaft axis of rotation being disposed in a second generally horizontal plane below said first generally horizontal plane.

2. The transaxle of claim 1 wherein said plurality of gears includes a plurality of companion gears fixed to said counter shaft and a plurality of selectively engagable spur gears rotatably disposed on said input receiving shaft, said spur gears enmeshed with said companion gears.

3. The transaxle of claim 2 wherein said axle shaft, said counter shaft, and said input receiving shaft are generally parallel.

4. The transaxle of claim 1 wherein said housing includes an upper portion and a lower portion connected along a split line, said axle shaft and said counter shaft are rotatably carried by a plurality of friction reducing bearings, and said bearings are integrally formed in said housing along said split line.

5. The transaxle of claim 1 further comprising a brake assembly fixed to said housing and disposed to engage one of said plurality of shafts.

6. The transaxle of claim 5 wherein said brake assembly engages said input receiving shaft.

7. The transaxle of claim 1 wherein said housing comprises an upper and a lower housing generally defining a split line at the interface therebetween, and said split line is generally coplanar with said first horizontal plane.

8. The transaxle of claim 7 wherein said lower housing includes a recess below said split line, said upper housing includes a projection projecting below said split line and forming a secondary split line, and said recess and said projection rotatably support said input receiving shaft along said secondary split line.

9. The transaxle of claim 8 wherein said recess and said projection define an integral friction reducing bearing for rotatably supporting said input receiving shaft.

10. The transaxle of claim 7 wherein said lower housing includes a plurality of recesses below said split line, said upper housing includes a plurality of projections projecting below said split line and forming a secondary split line, and said recesses and said projections rotatably support said input receiving shaft in said second horizontal plane along said secondary split line.

11. The transaxle of claim 10 wherein said recesses and said projections define a plurality of integral friction reducing bearings for rotatably supporting said input receiving shaft.

12. A transaxle for a vehicle comprising:

a housing;

a vertical input shaft rotatably disposed in said housing and having a top end extending out of said housing;

an axle shaft rotatably disposed within said housing and having a central axis which is disposed generally coplanar with a first generally horizontal plane;

an input receiving shaft rotatably disposed within said housing and operably connected to said vertical input shaft, said input receiving shaft having a central axis; and a plurality of gears on said input receiving shaft and said axle shaft interconnected to transmit rotational motion from said input receiving shaft to said axle shaft;

said input receiving shaft central axis disposed generally coplanar with a second generally horizontal plane below said first generally horizontal plane.

13. The transaxle of claim 12 wherein said housing includes an upper housing and a lower housing connected along a split line, said axle shaft and said input receiving shaft are rotatably carried by a plurality of friction reducing bearings, said bearings integrally formed in said housing along said split line.

14. The transaxle of claim 12 further comprising a brake assembly fixed to said housing and disposed to engage said input receiving shaft.

15. The transaxle of claim 12 wherein said axle shaft and said input receiving shaft are generally parallel.

16. The transaxle of claim 12 wherein said housing includes an upper housing and a lower housing generally defining a split line at the interface therebetween, and said split line is generally coplanar with said first horizontal plane.

17. The transaxle of claim 16 wherein said lower housing includes a recess below said split line, said upper housing includes a projection projecting below said split line and forming a secondary split line, and said recess and said projection rotatably support said input receiving shaft along said secondary split line.

18. The transaxle of claim 17 wherein said recess and said projection define an integral friction reducing bearing for rotatably supporting said input receiving shaft.

19. The transaxle of claim 16 wherein said lower housing includes a plurality of recesses below said split line, said upper housing includes a plurality of projections projecting below said split line and forming a secondary split line, and said recesses and said projections rotatably support said input receiving shaft in said second generally horizontal plane along said secondary split line.

20. The transaxle of claim 19 wherein said recesses and said projections define a plurality of integral friction reducing bearings for rotatably supporting said input receiving shaft.

* * * * *